US008965973B2

(12) United States Patent
Gao

(10) Patent No.: US 8,965,973 B2
(45) Date of Patent: Feb. 24, 2015

(54) METHOD AND APPARATUS FOR CALL PROCEEDING IN CALL CONTROL OF APPLICATION SERVER

(75) Inventor: Yang Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 43 days.

(21) Appl. No.: 13/388,338

(22) PCT Filed: May 20, 2010

(86) PCT No.: PCT/CN2010/072974
§ 371 (c)(1),
(2), (4) Date: Feb. 1, 2012

(87) PCT Pub. No.: WO2011/017957
PCT Pub. Date: Feb. 17, 2011

(65) Prior Publication Data
US 2012/0136938 A1  May 31, 2012

(30) Foreign Application Priority Data

Aug. 14, 2009  (CN) .......................... 2009 1 0165676

(51) Int. Cl.
*G06F 15/16* (2006.01)
*H04L 29/06* (2006.01)
(52) U.S. Cl.
CPC ........ *H04L 65/1063* (2013.01); *H04L 65/1093* (2013.01)
USPC ...................................................... 709/204
(58) Field of Classification Search
CPC .................... H04L 65/1063; H04L 65/1093
USPC .......... 709/204–207, 220–237; 370/260–271; 379/157–158, 202.01–206.01
See application file for complete search history.

(56) References Cited

U.S. PATENT DOCUMENTS 7,382,879 B1   6/2008  Miller
7,796,603 B1 *  9/2010  Bertone et al. ............. 370/395.2
(Continued)

FOREIGN PATENT DOCUMENTS

CN    101005511 A    7/2007
CN    101247388 A    8/2008
(Continued)

OTHER PUBLICATIONS

Rosenberg et al. (Rosenberg J., Best Current Practices for Third Party Call Control (3pcc) in the Session Initiation Protocol (SIP), Apr. 2004, Network Working Group, RFC 3725, p. 1-32).*
(Continued)

*Primary Examiner* — Brian J Gillis
*Assistant Examiner* — Michael A Keller
(74) *Attorney, Agent, or Firm* — Stephen Yang; Ling Wu; Ling and Yang Intellectual Property

(57) ABSTRACT

The invention discloses a method for call proceeding in call control of an application server, comprising: the application server sending an Offer message to a second party after making a media consultation with a first party; the application server receiving an Answer message sent from the second party, and transforming the Answer message into the Offer message and then sending to the first party, wherein, the Offer message carries a confirmation request for a Precondition state of the first party; the application server receiving the Answer message sent from the first party, wherein, the Answer message carries a confirmation response to the Precondition state from the first party; when determining that the Answer message meets a condition for transforming the Answer message, the application server transforming the Answer message into the Offer message and then sending to the second party.

10 Claims, 4 Drawing Sheets

(56) References Cited

U.S. PATENT DOCUMENTS

| | | | |
|---|---|---|---|
| 2005/0271195 A1* | 12/2005 | Andrews et al. | 379/210.01 |
| 2006/0239242 A1* | 10/2006 | Huffschmid | 370/352 |
| 2008/0037481 A1 | 2/2008 | Chiang et al. | |
| 2008/0270618 A1* | 10/2008 | Rosenberg | 709/228 |
| 2009/0116628 A1* | 5/2009 | Ropolyi | 379/114.22 |
| 2009/0225725 A1* | 9/2009 | Zhu | 370/331 |
| 2009/0290573 A1* | 11/2009 | Belling et al. | 370/352 |
| 2009/0300189 A1* | 12/2009 | Takeda et al. | 709/227 |
| 2010/0036958 A1* | 2/2010 | Mahdi | 709/227 |
| 2010/0066804 A1* | 3/2010 | Shoemake et al. | 348/14.02 |
| 2010/0098229 A1* | 4/2010 | Sakata et al. | 379/142.04 |
| 2010/0181373 A1* | 7/2010 | Murakami et al. | 235/375 |
| 2010/0279670 A1* | 11/2010 | Ghai et al. | 455/414.3 |
| 2010/0287285 A1* | 11/2010 | Castellanos et al. | 709/227 |
| 2011/0243149 A1* | 10/2011 | Xie | 370/410 |

FOREIGN PATENT DOCUMENTS

| | | |
|---|---|---|
| CN | 101459897 A | 6/2009 |
| CN | 101491057 A | 7/2009 |
| WO | 2007005070 A2 | 1/2007 |
| WO | 2009089904 A1 | 7/2009 |

OTHER PUBLICATIONS

International Search Report for PCT/CN2010/072974 dated Jun. 28, 2010.

* cited by examiner

METHOD AND APPARATUS FOR CALL PROCEEDING IN CALL CONTROL OF APPLICATION SERVER

TECHNICAL FIELD

The present invention relates to the field of communication, and in particular, to a method and apparatus for call proceeding in call control of an application server.

BACKGROUND OF THE RELATED ART

3PCC (the Third Party of Conversation Control) means that the third party controller creates a session between other two parties, and the controller is responsible for the media negotiation between the two parties of the session. 3PCC is a very flexible controlling mode, which may be divided into the flow where a 3PCC creation request message carries a SDP (Session Description Protocol) message and the flow where the 3PCC creation request message does not carry the SDP message, wherein, the SDP message comprises an Offer message and an Answer message.

The flow where the 3PCC creation request message carries the SDP message exists in call forwarding, automatic machine and call transferring and other services, which is specifically as shown in FIG. 1 and comprises the following steps.

Step 101, the first party has made a media negotiation with an AS (Application Server).

Step 102, the AS sends an Offer message to the second party.

Wherein, the Offer message may be born in a call creation request message, which may be but not limited to an Invite message.

Step 103, the second party sends an Answer message to the AS after receiving the Offer message.

Wherein, the Answer message may be born in a reliable transmission temporary response message, which comprises but is not limited to a 180 response message, a 181 response message or a 183 response message.

Wherein, the Answer message comprises descriptions on media type, a confirmation request for the Precondition state of the first party, transmission protocol, media format and so on. Wherein, the Precondition state may be but not limited to QoS (Quality of Service) state, and the Precondition state requires a level of mandatory.

Step 104, the AS receives the Answer message and sends the Offer message to the first party.

Wherein, the Offer message may be born in an update request message, which comprises but is not limited to an Update message and a Re-invite message.

Specifically, the AS extracts the Answer message after receiving the reliable transmission temporary response message carrying the Answer message, transforms the extracted Answer message into the Offer message, and sends the Offer message to the first party by bearing the Offer message in an update request message.

Step 105, the first party sends the Answer message to the AS after receiving the Offer message.

Wherein, the Answer message may be born in an update request response message, wherein, the update request response message comprises but is not limited to a 200 OK response message or a 183 response message. Wherein, the Answer message comprises descriptions on media type, a confirmation response of the Precondition state from the first party, transmission protocol and media format and so on. Wherein, the Precondition state may be but not limited to QoS (Quality of Service) state, and the Precondition state requires a level of mandatory.

In the implementation of the invention, the following questions are found by the inventor in the existing technologies:

Since the second party needs the confirmation response to the Precondition state from the first party, the first party sends the confirmation response to the Precondition state to the AS by bearing it in the Answer message in step 105, but the AS will intercept the Answer message, thus causing the call to be unable to proceed.

SUMMARY OF THE INVENTION

The technical problem to be solved in the invention is to provide a method and apparatus for call proceeding in call control of an application server, which may solve the problem in the existing technology that the call is unable to proceed due to the reason that the second party can not obtain the confirmation response to the Precondition state from the first party.

To solve the above problem, the invention provides a method and apparatus for call proceeding in call control of an application server, and the technical scheme is as follows:

a method for call proceeding in call control of an application server, comprising:

the application server sending an Offer message to a second party after making a media negotiation with a first party;

the application server receiving the Answer message sent from the second party, transforming the Answer message sent from the second party into the Offer message and then sending the Offer message to the first party, wherein, the Offer message carries a confirmation request for a Precondition state of the first party;

the application server receiving the Answer message sent from the first party, wherein, the Answer message carries a confirmation response to the Precondition state from the first party;

the application server determining whether the Answer message meets a condition for transforming the Answer message;

if yes, the application server transforming the Answer message into the Offer message and then sending to the second party.

Wherein, the operation of transforming the Answer message into the Offer message is: bearing information associated with the Precondition state in the Answer message in the Offer message.

The operation of the application server making the media negotiation with the first party is: the application server directly making the media negotiation with the first party;

or, the application server, as a proxy or B2BUA (back-to-back user agent), making the media negotiation with the first party.

An apparatus for call proceeding in call control of an application server, comprising:

a first sending module, which is configured to send an Offer message to a second party after making a media negotiation with a first party;

a first receiving module, which is configured to receive the Answer message sent from the second party, wherein, the Answer message carries a confirmation request for a Precondition state of the first party;

a transforming module, which is configured to transform the Answer message into the Offer message;

a second sending module, which is configured to send the Offer message transformed by the transforming module to the first party;

a second receiving module, which is configured to receive the Answer message sent from the first party, wherein, the Answer message carries a confirmation response to the Precondition state from the first party;

a determining module, which is configured to determine whether the Answer message received by the second receiving module meets a condition for transforming the Answer message;

the transforming module is further configured to, when the determining result of the determining module is yes, transform the Answer message into the Offer message;

the second sending module is further configured to send the Offer message transformed by the second receiving module to the second party.

In the technical scheme provided in the invention, whether the Answer message carrying the Precondition state needs to be transformed into the Offer message is determined according to the condition of transforming the Answer message; if yes, the transformed Offer message is sent, which may cause the call to proceed and is beneficial to the development of 3PCC service; if not, the Answer message is intercepted, which can decrease unnecessary signaling, avoid the oscillating of media negotiation and improve quality of service.

BRIEF DESCRIPTION OF DRAWINGS

FIG. 3 is a flowchart of the first party directly making a consultation with the AS.

PREFERRED EMBODIMENTS OF THE PRESENT INVENTION

The core spirit of the invention is: determining whether it needs to transform the Answer message carrying the Precondition state into the Offer message according to the condition of transforming the Answer message, if yes, sending the transformed Offer message, which may cause the call to proceed and is beneficial to the development of 3PCC service; if not, intercepting the Answer message, which can decrease unnecessary signaling, avoid the oscillating of media negotiation and improve service quality.

The technical scheme of the invention will be described in detail below with reference to the drawings and preferred embodiments.

Figure 1:
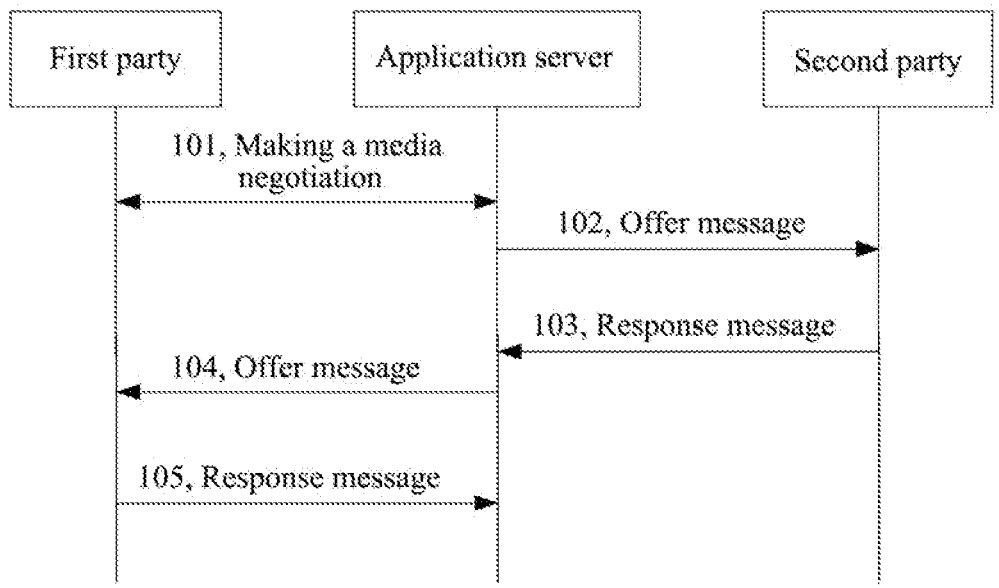
FIG. 1 is a flowchart of a 3PCC creation request message carrying a SDP message provided by the existing technology.
Figure 2:
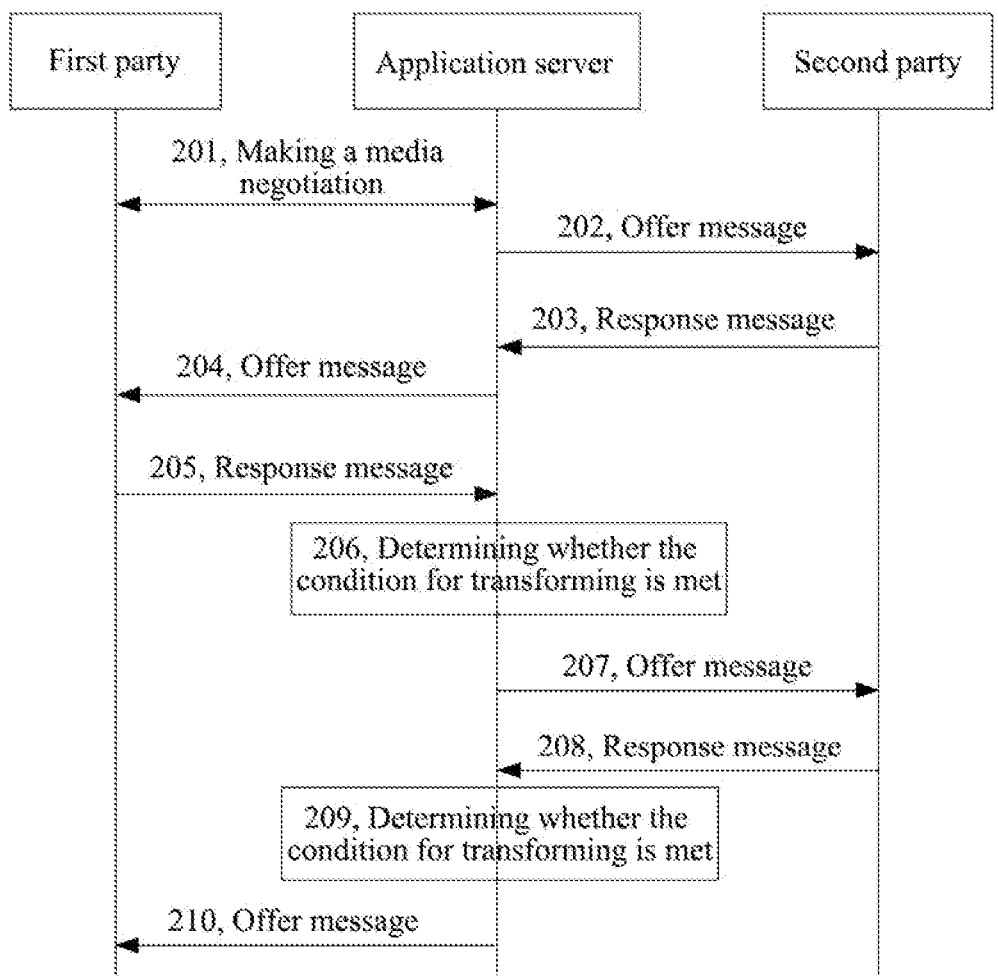
FIG. 2 is a flowchart of the method for call proceeding in 3PCC provided by an example of the invention.
Figure 3:
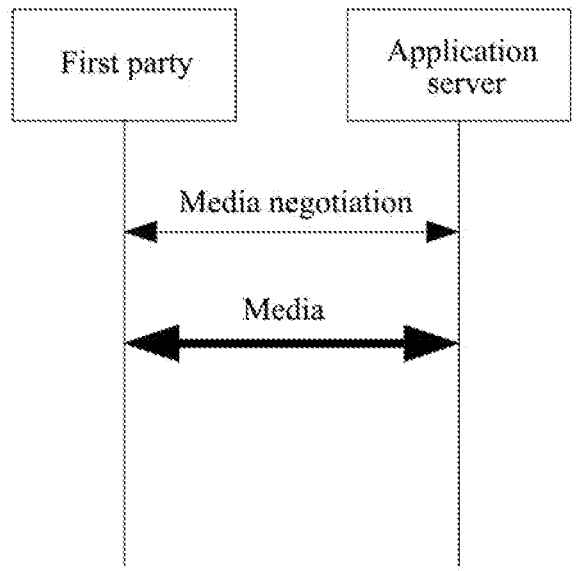

An example of the invention provides a method for call proceeding in 3PCC, as shown in FIG. 2, comprising:

The content in steps 201 to 205 is similar to that in steps 101 to 105, wherein, the first party in step 201 has made a media negotiation with an AS (Application Server), and the consultation is specifically as follows:

FIG. 3 is the flowchart of the first party directly making a consultation with the AS. As shown in FIG. 3, the first party directly makes a media negotiation with the AS, and the corresponding media data stream is transmitted between the first party and the application server after the media consultation.

Figure 4:
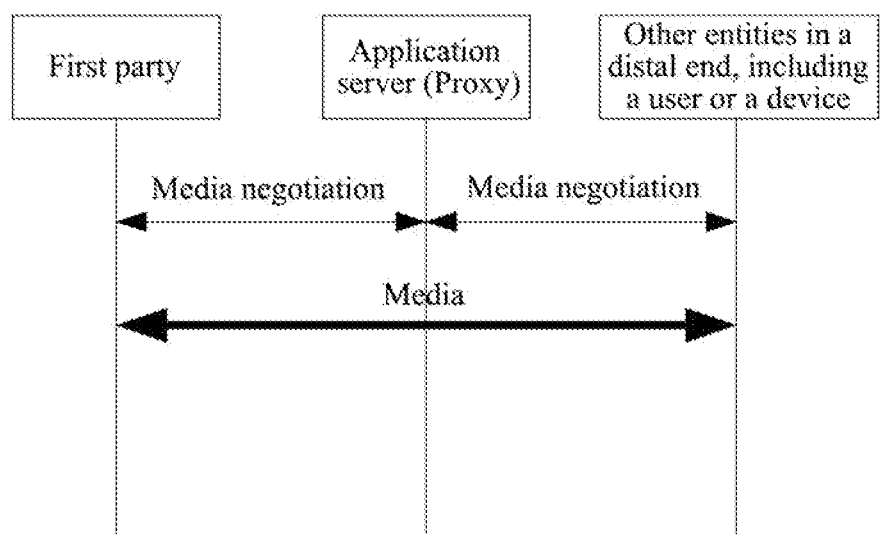
FIG. 4 is a flowchart of the first party making a consultation with the AS as a proxy.

FIG. 4 is the flowchart of the first party making a consultation with the AS as a proxy. As shown in FIG. 4, the AS, as the proxy of the opposite party (other entity such as a user or device and so on in a distal end), makes a media negotiation with the first party, and the corresponding media data stream is transmitted between the first party and the other party after the media consultation, wherein, the media data stream does not pass through the AS.

Figure 5:
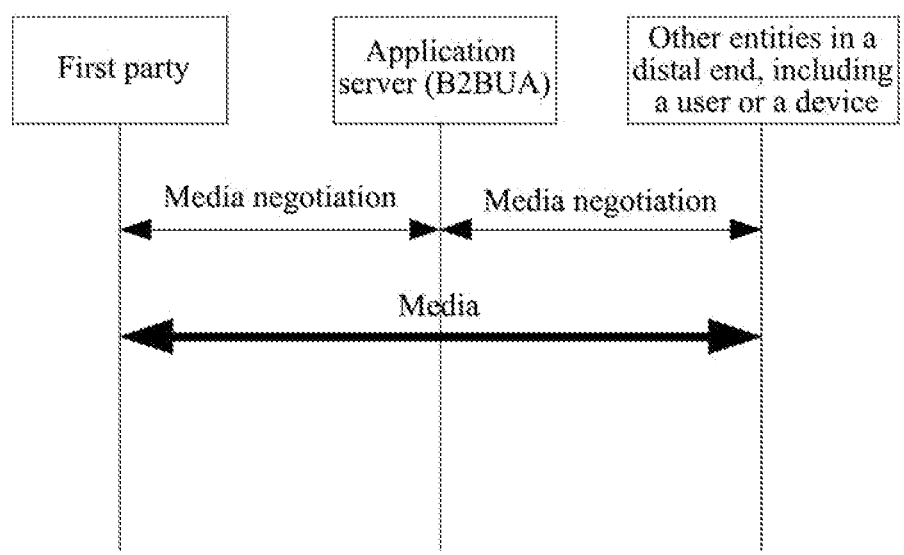
FIG. 5 is a flowchart of the first party making a consultation with the AS as a B2BUA.

FIG. 5 is the flowchart of the first party making a consultation with the AS as a B2BUA (back-to-back user agent). As shown in FIG. 5, the AS, as the B2BUA of the opposite party (other entity such as a user or device and so on in a distal end), makes a media negotiation with the first party, and the corresponding media data stream is transmitted between the first party and the other party after the media consultation, wherein, the media data stream does not pass through the AS.

Step 206, the AS receives an Answer message, determines whether the Answer message meets a condition for transforming the Answer message; if yes, performs step 207; if not, intercepts the Answer message.

Wherein, the condition for transforming the Answer message comprises the first transforming condition and/or the second transforming condition. Wherein, the first transforming condition comprises:

(1) a level required for the Precondition state in the consultation between the first party and the second party is mandatory;

(2) the request of confirmation of the Precondition state by the opposite party exists in the last Answer message of the other party having an Answer message to be transparently transmitted.

For example, taking the Precondition state as a QoS state for instance, the second party carries the confirmation request for the Precondition state from the first party in the SDP message in 203, and the confirmation request corresponds to the conf row of the SDP.

(3) the confirmation response to the Precondition state in the Answer message to be transparently transmitted needs to meet the state in the confirmation request.

For example, the Precondition state in the Answer message to be transparently transmitted, QoS state, needs to meet the state of the conf row in SDP, and the state may be a receiving state, transmitting state or transceiving state.

The second transforming condition comprises:

(4) the confirmation request for the Precondition state from the opposite party exists in the Answer message to be transparently transmitted, and the current Precondition state of the opposite party does not meet the Precondition state in the confirmation request, in which case, the Answer message needs to be transformed into the Offer message.

For example, in step 203, the Answer message sent from the second party to the AS carries the Precondition state of the second party. In step 205, the Answer message sent from the first party to the AS further comprises the confirmation request for the Precondition state from the second party. After determining, the AS knows that the Precondition state in 203 does not meet the Precondition state in the confirmation request in step 205, in which case, the AS transforms the Answer message into the Offer message.

Step 207, the AS transforms the Answer message into the Offer message and then sends to the second party.

Wherein, the Offer message may be born in an update request message, which may be but not limited to an Update message or a Re-invite message. The Offer message comprises: the confirmation response to the Precondition state from the first party.

Since the AS sends the confirmation response to the Precondition state from the first party to the second party, the second party may acquire the confirmation response to the Precondition state from the first party, and then the second party rings and the call proceeds.

It can be known from steps 201 to 207 that whether the Answer message needs to be transformed into the Offer message is determined according to the condition of transforming the Answer message, and if yes, the Answer message is transformed into the Offer message and sent to enable the second party to know the confirmation response to the Precondition state from the first party, by which the second party rings and the call may proceed; if not, the Answer message is intercepted to decrease unnecessary signaling.

However, in practical applications, the following cases may occur, that is, in step 205, when the first party sends the Answer message to the AS, the confirmation request for the Precondition state of the second party will be carried in the Answer message. If the first party is unable to know the confirmation response to the Precondition state from the second party, the first party will not ring and the call can not proceed. In this case, the following steps are further included:

Step 208, the second party receives the Offer message and sends the Answer message to the AS.

Wherein, the Answer message may be born in an update request response message, which may be but not limited to a 200OK response message or a 183 response message. Wherein, the Offer message comprises: media type, a confirmation request for the Precondition state from the second party, transmission protocol and media format and so on.

Step 209, the AS receives the Answer message and determines whether the Answer message meets the condition for transforming the Answer message, if yes, performs step 210; if not, intercepts the Answer message.

Reference may be made to step 206 for the specific content, which will not be repeated here.

Step 210, the AS transforms the Answer message into the Offer message and sends to the first party.

Wherein, the Offer message may be born in an update request message, which comprises but is not limited to an Update message and a Re-invite message. The Offer message comprises descriptions on media type, a confirmation response to the Precondition state from the second party, transmission protocol and media format and so on.

Since the AS sends the confirmation response of the Precondition state from the second party to the first party, the first party may know the confirmation response to the Precondition state from the second party, and then the first party rings and the call proceeds.

It may be discovered by repeatedly performing steps 206 to 207 and/or steps 208 to 210 that whether the Answer message needs to be transformed into the Offer message is determined according to the condition of transforming the Answer message, and if yes, the Answer message is transformed into the Offer message and sent to enable one party to know the confirmation response to the Precondition state from the other party, by which the call may proceed; if not, the Answer message is intercepted to decrease unnecessary signaling, avoid the oscillating of media consultation, thus improving service quality.

Figure 6:
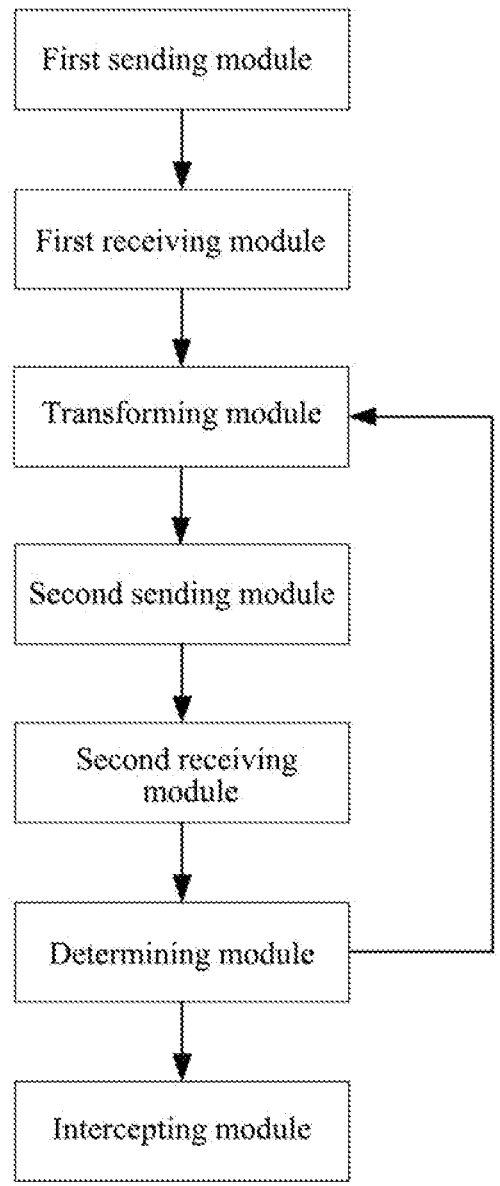
FIG. 6 is a structure diagram of the apparatus for call proceeding in 3PCC provided by an example of the invention.

Based on the same inventive concept as in the method example, another example of the invention provides an apparatus for call proceeding in 3PCC. As shown in FIG. 6, the apparatus comprises:

a first sending module, which is configured to send an Offer message to a second party after making a media negotiation with a first party;

a first receiving module, which is configured to receive the Answer message sent from the second party; wherein, the Answer message carries a confirmation request for Precondition state of the first party;

a transforming module, which is configured to transform the Answer message into the Offer message;

a second sending module, which is configured to send the Offer message transformed by the transforming module to the first party;

a second receiving module, which is configured to receive the Answer message sent from the first party, wherein, the Answer message carries a confirmation response to the Precondition state from the first party;

a determining module, which is configured to determine whether the Answer message received by the second receiving module meets a condition for transforming the Answer message;

the transforming module is further configured to, when the determining result of the determining module is yes, transform the Answer message into the Offer message;

the second sending module, which is further configured to send the Offer message transformed by the transforming module to the second party.

Furthermore, the apparatus further comprises:

an intercepting module, which is configured to intercept the Answer message sent from the first party when the determining result of the determining module is not.

Furthermore, the second receiving module is further configured to receive the Answer message sent from the second party;

the determining module is further configured to determine whether the Answer message sent from the second party meets the condition for transforming the Answer message;

the transforming module is further configured to transform the Answer message sent from the second party into the Offer message;

the second sending module is further configured to send the transformed Offer message to the first party.

Furthermore, the intercepting module is further configured to intercept the Answer message sent from the second party when the determining result of the determining module is not.

Wherein, the condition for transforming the Answer message comprises a first transforming condition and/or a second transforming condition; wherein, the first transforming condition comprises:

a level required for the Precondition state the consultation between the first party and the second party is mandatory;

the confirmation request for the Precondition state from an opposite party exists in the last Answer message of an Answer message to be transformed;

the Precondition state in the Answer message to be transformed meets the state in the confirmation request.

The second transforming condition comprises:

the confirmation request for the Precondition state from the opposite party exists in the Answer message to be transformed, and the current Precondition state of the opposite party does not meet the Precondition state in the confirmation request of the last Answer message of the Answer message to be transformed.

In the examples of the invention, whether the Answer message carrying the Precondition state needs to be transformed into the Offer message is determined according to the condition of transforming the Answer message, if yes, the transformed Offer message is sent, which can cause the call to proceed and is beneficial to the development of 3PCC service; if not, the Answer message is intercepted, which can decrease unnecessary signaling, avoid the oscillating of media negotiation and improve service quality.

What is claimed is:

1. A method for call proceeding in call control of an application server based on Third Party of Conversation Control, comprising:
   a first party which initiating a calling session;
   a second party which receiving and responding in the calling session;
   an application server as a third party who controlling the calling session between the first and second party; wherein,
   the application server sending a first Offer message to the second party after making a media consultation with the first party;
   the application server receiving a first Answer message carrying a Precondition state of the second party sent from the second party, transforming the first Answer message sent from the second party into a second Offer message and then sending the transformed second Offer message to the first party, wherein, the transformed second Offer message carries information about the Precondition state of the second party and a confirmation request for a Precondition state of the first party;
   the application server receiving a second Answer message sent from the first party, wherein, the second Answer message sent from the first party carries a confirmation response to the Precondition state of the first party;
   the application server, when determining that the second Answer message sent from the first party meets a condition for transforming the Answer message, transforming the second Answer message sent from the first party into a third Offer message carrying the Precondition state of the first party and then sending to the second party so as to make the second party ring;
   wherein, the condition for transforming the Answer message comprises a first transforming condition or a second transforming condition; wherein,
   the first transforming condition comprises at least one of the following conditions:
   a level required for the Precondition state in the consultation between the first party and the second party is mandatory;
   the first Answer message sent from the second party carries the confirmation request for the Precondition state of the first party, and the Precondition state of the first party in the second Answer message sent from the first party meets the Precondition state in the confirmation request;
   the second transforming condition comprises:
   a confirmation request for a Precondition state of the second party exists in the second Answer message sent from the first party, and the current Precondition state of the second party obtained by the application server when the application server receives the first Answer message sent from the second party does not meet the Precondition state of the second party in the confirmation request carried by the second Answer message sent from the first party.

2. The method according to claim 1, wherein, the method further comprises:
   when determining that the second Answer message sent from the first party does not meet the condition for transforming the Answer message, the application server intercepting the second Answer message sent from the first party.

3. The method according to claim 2, wherein, after the step of the application server determining whether the second Answer message sent from the first party meets the condition for transforming the Answer message, the method further comprises:
   the application server receiving a third Answer message sent from the second party/the first party once again;
   when determining once again that the third Answer message sent from the second party/the first party meets the condition for transforming the Answer message, the application server transforming the third Answer message sent from the second party/the first party into a fourth Offer message and then sending to the first party/the second party.

4. The method according to claim 3, wherein, the method further comprises:
   when determining once again that the third Answer message sent from the second party does not meet the condition for transforming the Answer message, the application server intercepting the third Answer message sent from the second party.

5. The method according to claim 1, wherein, the operation of transforming the Answer message into the Offer message is: bearing information associated with the Precondition state in the Answer message in the Offer message.

6. The method according to claim 1, wherein, the operation of the application server making the media consultation with the first party is: the application server directly making the media consultation with the first party;
   or, the application server, as a proxy or a B2BUA (back-to-back user agent), making the media consultation with the first party.

7. An apparatus in an application server for call proceeding in call control based on Third Party of Conversation Control, comprising a processor, and a storage device for storing computer executable instructions that when executed by the processor cause the processor to perform the steps in following modules:
   a first sending module, which is configured to send a first Offer message to a second party after making a media consultation with a first party; wherein, the first party is the party which initiating a calling session and the second party is the party which receiving and responding in the calling session;
   a first receiving module, which is configured to receive a first Answer message sent from the second party, wherein, the first Answer message carries a Precondition state of the second party and a confirmation request for a Precondition state of the first party;
   a transforming module, which is configured to transform the first Answer message sent from the second party into a second Offer message, wherein, the transformed second Offer message carries information about the Precondition state of the second party and the confirmation request for the Precondition state of the first party;
   a second sending module, which is configured to send the second Offer message transformed by the transforming module to the first party;
   a second receiving module, which is configured to receive a second Answer message sent from the first party, wherein, the second Answer message carries a confirmation response to the Precondition state of the first party;
   a determining module, which is configured to determine whether the second Answer message sent from the first party meets a condition for transforming the second Answer message;

the transforming module, which is further configured to, when a determining result of the determining module is yes, transform the second Answer message sent from the first party into a third Offer message carrying the Precondition state of the first party;

the second sending module, which is further configured to send the third Offer message obtained by transforming the second Answer message sent from the first party to the second party so as to make the second party ring;

wherein, the condition for transforming the Answer message comprises a first transforming condition or a second transforming condition; wherein, the first transforming condition comprises at least one of the following conditions:

a level required for the Precondition state in the consultation between the first party and the second party is mandatory;

the first Answer message sent from the second party carries the confirmation request for the Precondition state of the first party, and the Precondition state of the first party in the second Answer message sent from the first party meets the Precondition state in the confirmation request;

the second transforming condition comprises:

a confirmation request for a Precondition state of the second party exists in the second Answer message sent from the first party, and the current Precondition state of the second party obtained by the application server when the application server receives the first Answer message sent from the second party does not meet the Precondition state of the second party in the confirmation request carried by the second Answer message sent from the first party.

8. The apparatus in the application server according to claim 7, wherein, the storage device is for storing computer executable instructions that when executed by the processor cause the processor to perform steps in the following further module:

an intercepting module, which is configured to intercept the second Answer message sent from the first party when the determining module determines that the second Answer message sent from the first party does not meet the condition for transforming the Answer message.

9. The apparatus in the application server according to claim 8, wherein, the second receiving module is further configured to receive a third Answer message sent from the second party;

the determining module is further configured to trigger the transforming module once again when determining that the third Answer message sent from the second party meets the condition for transforming the Answer message;

the transforming module is further configured to transform the third Answer message sent from the second party into a fourth Offer message;

the second sending module is further configured to send the fourth Offer message obtained by transforming the Answer message sent from the second party to the first party.

10. The apparatus in the application server according to claim 9, wherein, the intercepting module is further configured to intercept the third Answer message sent from the second party when the determining module determines once again that the third Answer message sent from the second party does not meet the condition for transforming the Answer message.

\* \* \* \* \*